Aug. 9, 1960 N. D. LARKY ET AL 2,948,775

COLOR TELEVISION AUTOMATIC CHROME CONTROL CIRCUIT

Original Filed Oct. 20, 1954 2 Sheets-Sheet 1

INVENTORS
NORBERT D. LARKY
CHARLES B. OAKLEY
BY
ATTORNEY

COLOR TELEVISION AUTOMATIC CHROME CONTROL CIRCUIT

Original Filed Oct. 20, 1954 2 Sheets-Sheet 2

INVENTORS
NORBERT D. LARKY
CHARLES B. OAKLEY
BY [signature]
ATTORNEY 2,948,775

COLOR TELEVISION AUTOMATIC CHROMA CONTROL CIRCUIT

Norbert D. Larky, Somerville, and Charles B. Oakley, Hamilton Square, N.J., assignors to Radio Corporation of America, a corporation of Delaware Continuation of abandoned application Ser. No. 463,448, Oct. 20, 1954. This application June 2, 1958, Ser. No. 739,434

8 Claims. (Cl. 178—5.4)

The present invention relates to automatic chroma control circuits for use in color television receivers and in particular to those automatic chroma control circuits which distinguish between the amplitude levels of the high frequency and the low frequency components in the color television signal. This application is a continuation of an application entitled "Color Television," filed by Norbert D. Larky and Charles B. Oakley on October 20, 1954, Serial No. 463,448, now abandoned.

In the color television signal which conforms to standards which were approved by the Federal Communications Commission on December 17, 1953, a luminance signal which describes the brightness components in the color television image is transmitted. This luminance signal is accompanied by horizontal and vertical scanning synchronizing signals, a chrominance signal, and color synchronizing bursts. The chrominance signal representing modulation of a color subcarrier defines color-difference information which describes how each color in the televised scene differs from the corresponding color content of the luminance signal. This color difference information is, in the process of signal reception, derived from the chrominance signal by a process of synchronous demodulation resulting in a plurality of color difference signals. The color synchronizing bursts which are located on the back porches of the horizontal synchronizing pulses furnish reference phase information which is used for this synchronous demodulation process. The color synchronizing bursts are of the same frequency as the color subcarrier defining the chrominance signal.

In the color television receiver which accommodates the color television signal, it is important that automatic chrominance-signal amplitude control, or, as it will hereinafter be termed, automatic chroma control, be utilized. This function provides that in the output of the chrominance signal circuits, the color synchronizing burst amplitude level with remain substantially constant regardless of random selective frequency fading of signals in the chrominance region. The chrominance signal information is included in the higher frequency portion of the color television spectrum; since automatic gain control of the color television receiver is usually derived from the amplitude level of certain lower frequency components of the color television signal, it is also desirable that the automatic chroma control be caused to be a function of automatic-gain-control signal information. In this way, the automatic chroma control circuit will maintain an amplitude level of the chrominance signal components which provides for proper proportion between the amplitudes of the higher frequency components and the lower frequency components in the color television signal.

The color synchronizing bursts, transmitted in the color television signal, are utilized to synchronize the phase of the signal output of a suitable demodulating signal source; these demodulating signals are then employed to synchronously demodulate the desired color-difference signals. The color synchronizing bursts, however, are used to give an indication of the amplitude of the chrominance signal for use in the automatic-chroma control system.

It is, therefore, an object of this invention to provide a combined burst-synchronized oscillator and burst separation means which develops signals useful to provide automatic-chroma control in a color television receiver.

It is still another object of this invention to provide an improved automatic-chroma control circuit which derives color information from the amplitude of the color synchronizing bursts relative to the amplitude of the horizontal synchronizing pulse.

It is still a further object of this invention to provide an improved automatic-chroma control circuit in which the overall transmission characteristics of the high frequency video signal components are adjusted to be commensurate with the overall transmission characteristics of the low frequency video signal components.

It is a still further object of this invention to provide an improved combined burst-synchronized signal source system and automatic-chroma control circuit which utilize the same circuitry to provide a measure of color-synchronizing burst amplitude for automatic-chroma control.

According to this invention, a detector circuit is utilized which provides a circuit for comparing the amplitude of the color synchronizing bursts with the output signal of a reference-phase demodulation-signal source and an automatic gain control signal from the automatic-gain-control detector of a television receiver to provide a composite bias which may be applied to one or more of the chrominance channel amplifiers for gain control of the chrominance channel amplifier. This composite bias is used to maintain the output level of the color burst synchronizing signal at the output of the chrominance channel substantially constant regardless of the amplitude level of the chrominance signal applied to the input of this channel. In addition, the automatic-chroma control system maintains the ratio of high frequency to low frequency response characteristic from transmitter to the output of the receiver substantially constant; the nature of the composite bias is such that the net product of the amplitude of the demodulating signal and the amplitude of the color synchronizing bursts is maintained substantially constant so that the output signal of the demodulating circuits will be rendered substantially free of amplitude variations due to selective frequency fading in the radio transmission path between transmitter and receiver.

In one form of the present invention, an oscillator is provided which utilizes a piezo-electric crystal as one of its resonators. This oscillator has an output frequency substantially that of the color synchronizing burst. A pulsed rectifier circuit is provided which is coupled to this oscillator; the pulsed rectifier circuit is adapted to receive the chrominance signal and color synchronizing bursts and to accept a gate pulse having the duration interval of the color synchronizing bursts. During the duration interval of the gate pulses, the color synchronizing bursts are gated into the oscillator to provide phase and frequency synchronization of that oscillator at the frequency and phase of the color synchronizing burst. The pulsed rectifier circuit also includes a rectifier and decay network into which the color synchronizing bursts and the output of the oscillator are gated and detected to establish a bias voltage representative of the amplitude level of the color synchronizing bursts and the amplitude of the output signal delivered by the oscillator. A portion of the automatic-gain control voltage, as provided in another circuit of the color television receiver, is also injected into the decay circuit and added to the voltage which is provided there due to detection of the color synchronizing bursts. The pulsed rectifier network, therefore, not only provides burst separation for phase synchronization of the oscillator but also provides a combined output bias voltage which is representative of the difference between the amplitude of the color synchronizing bursts, the oscillator output, and the amplitude of the scanning synchronizing pulses. This bias voltage is then used to control the gain of one or more of the chrominance amplifiers in accordance with the requirements of the automatic-chroma control operation.

Other and incidental objects of this invention will become apparent upon a reading of the following specification and a study of the figures wherein.

Figure 1:
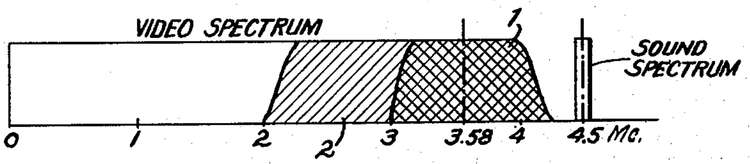
Figure 1 shows the spectrum of a color television signal.

Figure 1 shows the spectrum of a color television signal. The spectrum includes the video spectrum and the sound spectrum. As is seen from inspection of Figure 1, the video spectrum is included in a frequency range from approximately 0 to 4.2 mcs. This range includes luminance signal components. The color subcarrier has a frequency of 3.58 mcs. As is seen from the cross-hatched region bearing the designator 1, double side band information flanking the color subcarrier is represented for chrominance signal components having an upper frequency limit of approximately 0.6 mc., this side band region thereby has the frequency range from approximately 3 to 4.2 mcs. In the region bearing the designator 2, single side band information is included; this single side band information deals principally with high definition color information along the orange-cyan axis for which the eye has increased acuity. The sound is transmitted on a frequency modulated carrier which is displaced in frequency from the television picture carrier by 4.5 mcs.

Figure 2:
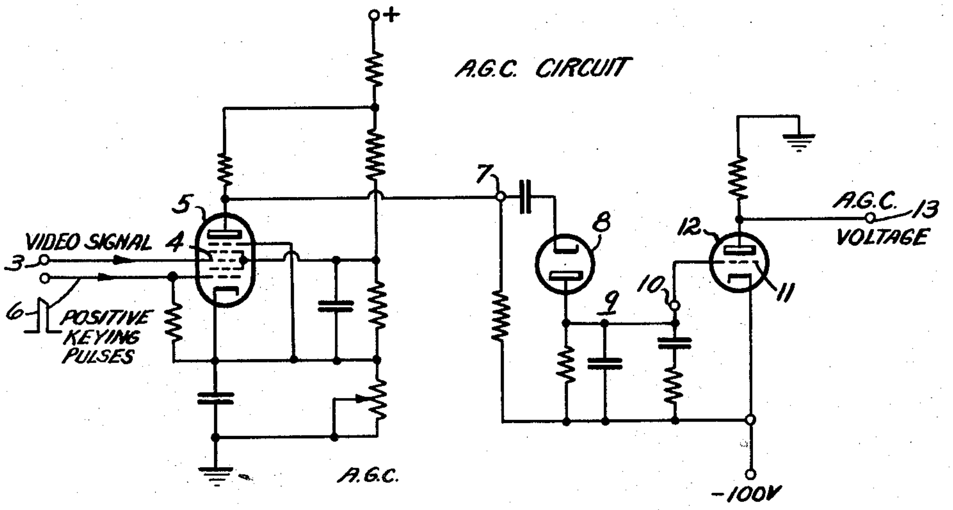
Figure 2 is a schematic diagram of a representative automatic-gain-control voltage generating circuit.

Consider the circuit diagram shown in Figure 2. This circuit diagram illustrates a representative type of automatic gain control or AGC circuit which may be utilized for producing an AGC voltage which is proportional to the amplitude of certain lower frequency components in a color television signal. The circuit shown in Figure 2 corresponds to Figure 14 of the paper entitled "Automatic Gain Control for Television Receivers" and published by Wendt and Schroeder in the September 1948 issue of the RCA Review. This circuit illustrates only one of the many circuits which are authoritatively discussed by Wendt and Schroeder and illustrates a keyed AGC circuit.

The operation of the circuit shown in Figure 2 is described as follows: a video signal is applied to the input terminal 3 and is therefrom applied to the grid 4 of the tube 5 at the same time a series of keying pulses 6 which have duration intervals within substantially the duration intervals of the horizontal synchronizing pulses are impressed on another control electrode of the tube 5. The keying pulses 6 turn the tube 5 on during the duration interval of these keying pulses so that a potential is developed at the output terminal 7 which is proportional to the amplitude of the horizontal synchronizing pulses. Utilizing the diode 8 and the decay network 9, the potential developed at the terminal 7 is detected to produce a bias potential at the terminal 10, this bias potential being a continuous voltage which is proportional to the height of the horizontal synchronizing pulses and therefore an approximate indication of the amplitude level of the lower frequency components in the video spectrum. The potential produced at the terminal 10 is then applied to the control grid 11 of the tube 12 which is so biased as to operate as a D.-C. amplifier which thereupon produces an AGC voltage at the output terminal 13. This AGC voltage, being an amplified version of the bias potential developed at terminal 10, is a continuous voltage which also yields a measure of the amplitude level of the lower frequency components of the color television signal.

Figure 3:
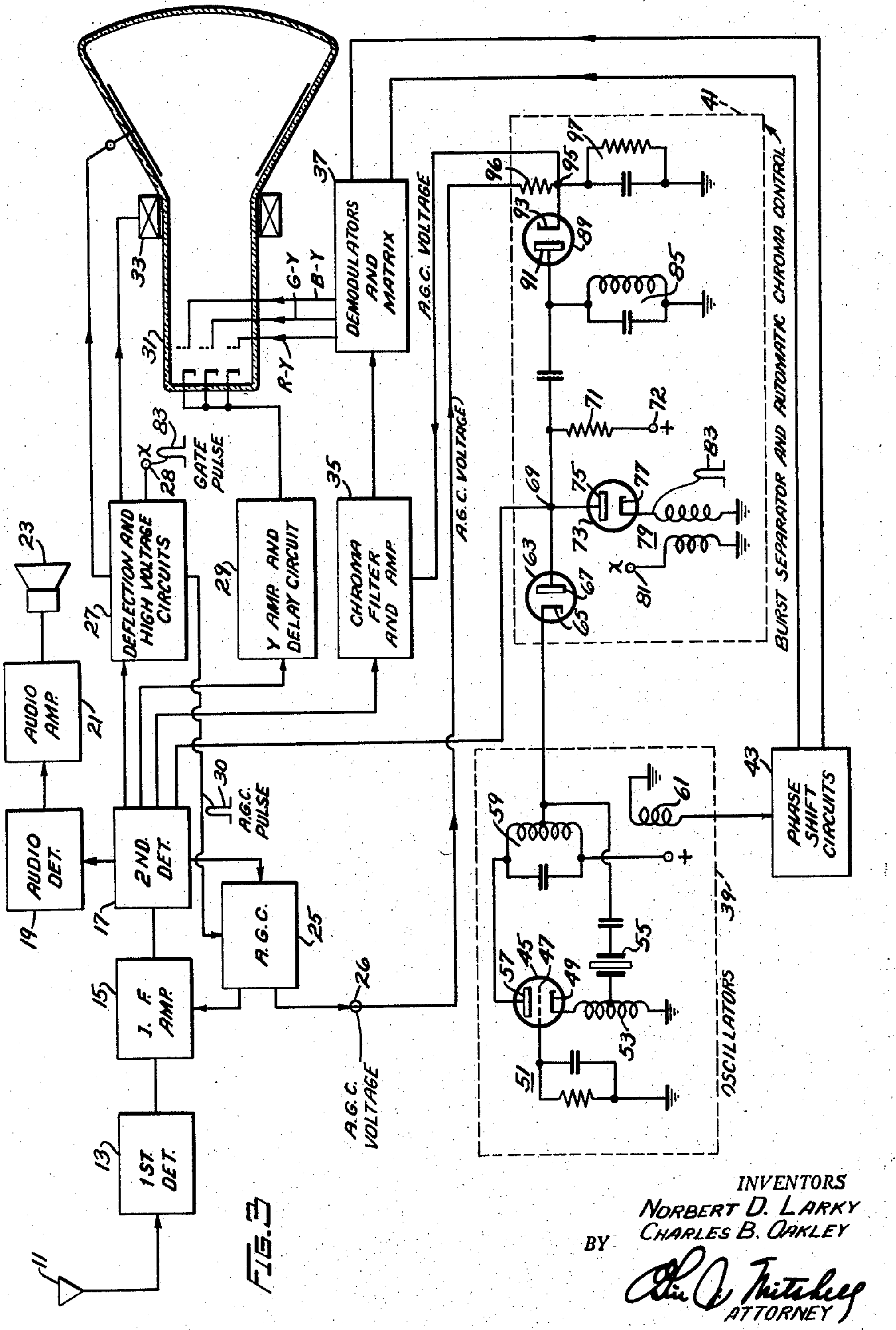
Figure 3 is a block diagram of a color television receiver and includes a schematic diagram of an oscillator, burst separator, and automatic-chroma control circuit which illustrates the teachings of the present invention.

In the color television circuit illustrated in Figure 3, an incoming television signal which is transmitted on a carrier arrives at the antenna 11 and is applied to the first detector 13. In the first detector 13, the carrier on which the color television signal is transmitted is heterodyned to the intermediate frequencies; the resulting signal is passed through the intermediate amplifier 15 into the second detector 17 where the color television signal is demodulated. For details of the operation of a first detector, an intermediate frequency amplifier, and a second detector, see, for example, the article by Antony Wright as published in the March 1947 issue of the RCA Review.

The recovered color television signal includes a sound modulated carrier which is transmitted on a frequency modulated carrier 4½ mcs. removed from the picture carrier. Utilizing, for example, intercarrier sound circuit, the sound information may be recovered in the audio detector 19, amplified in the audio amplifier 21, and applied to the loudspeaker 23.

The television receiver shown in the figure also includes a circuit which performs the function of automatic gain control; this circuit is represented by the AGC block bearing the designation 25. The AGC circuit 25 then samples the demodulated television signal as provided by the second detector 17 and produces an AGC voltage which is utilized for automatic gain control of the intermediate frequency amplifier 15. The AGC circuit 25 also produces the AGC voltage at the terminal 26; this AGC voltage is a function of the amplitude of the keyed-out lower frequency components of the color television signal.

The demodulated color television signal is coupled from the second detector 17 to the deflection and high voltage circuits 27 which provide deflection signals to the yoke 33, high voltage to the ultor of the color kinescope 31, a gate pulse 83 at the output terminal 28, and the AGC pulse 30 to the AGC circuit 25. The AGC pulses 30 utilized in the circuit in Figure 3 perform the same functions as the positive keying pulses 6 which are employed in the circuit in Figure 2.

The second detector also furnishes recovered color television signals to the Y amplifier and delay circuit 29 and to the chroma filter and amplifier circuit 35. The Y amplifier and delay circuit 29 applies the luminance or Y signal to the cathodes of the color image reproducer 31. The chroma filter and amplifier 35 in conjunction with the oscillator 39, the burst separator and automatic-chroma control 41, the phase shift circuits 43, and the demodulators and matrix 37, furnish $R-Y$, $G-Y$, and $B-Y$ color difference signals to appropriate control electrodes of the color image reproducer 31. Addition of the luminance signal and the color-difference signals is provided in the color image reproducer 31 to impress the component color signals into the electron beams of the color image reproducer 31 to display the color television image on the image face of the color image reproducer 31. For details of demodulators and color-difference-signal recovery circuits which are utilized in color television receivers, see, for example, the paper entitled "Color Television Signal Receiver Demodulators" by Pritchard and Rhodes as published in the June 1953 issue of the RCA Review.

The recovery of the $R—Y$, $G—Y$ and $B—Y$ color-difference signals is performed in the aforementioned circuits in the following manner. The color television signal is applied to the chroma filter and amplifier 35, which has a pass band from approximately 2 to 4.2 mcs. if full utilization of the color-difference signal information is to be achieved, or from approximately 3 to 4.2 mcs. if color-difference signal information having an upper frequency limit of approximately 0.6 mc. is to be employed. The resulting chrominance signals or chroma is applied to the input circuit of the demodulator and matrix 37. At the same time the color television signal is also applied to the burst separator and automatic-chroma control circuit 41. This circuit separates the color synchronizing bursts from the color television signal and produce automatic-chroma control voltage in a manner to be described. The automatic-chroma control voltage is applied to the chroma filter and amplifier 35 to control the gain of this circuit whereby the amplitude level of the chroma applied to the demodulator and martix 37 is regulated to correct for undesired variations in its amplitude attributable to selective frequency fading as above described. The separated color synchronizing bursts are applied to the oscillator 39 which is caused to operate in phase synchronism with the phase prescribed by the color synchronizing bursts. The oscillator 39 is then caused to drive the phase shift circuits 43 which apply one or more appropriately phased synchronous demodulating signals to the demodulator and matrix 37 wherein synchronous demodulation of the desired color-difference signals is performed. In some types of color television receivers, each of the $G-Y$, $R-Y$ and $B-Y$ color-difference signals are independently synchronously demodulated. In other types of color television receivers, a pair of prescribed color-difference signals, not necessarily of the $G-Y$, $R-Y$ and $B-Y$ color difference signal variety, may be synchronously demodulated. This pair of demodulated color-difference signals may then be combined in prescribed polarities and magnitudes with the luminance signal to form the color signals required for application to the color image reproducer 31.

Consider now the operation of the burst separator and automatic-chroma control circuit 41 and the oscillator 39; the operation of these circuits will clearly illustrate the operation of one form of the present invention.

The oscillator 39 utilizes the triode 45. A decay network 51 is coupled from the control grid 47 to ground. A resonant circuit 59 having a resonant frequency substantially that of the color synchronizing bursts is coupled to the anode 57. The oscillations developed in the resonant circuit 59 are coupled through the piezo-electric crystal 55 to the cathode choke 53. The piezo-electric crystal 55 also has a resonant frequency at the frequency of the color synchronizing bursts and is coupled to the cathode choke 53 in a manner whereby the circuit associated with the triode 45 is caused to oscillate and produce oscillations in the resonant circuit 59. A coil 61 is inductively coupled to the resonant circuit 59 to provide a driving signal for the phase shift circuits 43.

The color television signal is applied to the terminal 69 of the burst separator and automatic-chroma control circuit 41. When the diode 73 is maintained in conducting condition responsive to a positive voltage supplied through the resistor 71 from the positive potential terminal 72, terminal 69 is maintained substantially at ground potential. The cathode 65 of the diode 63 is coupled to the high potential circuits of the oscillator 39. When the diode 63 is non-conducting, the oscillator is caused to be isolated from the terminal 69 to which the color television signal is supplied. A gate-pulse transformer 79 is coupled from the cathode 77 of the diode 73 to ground. Terminal 81 of gate pulse transformer is coupled to the terminal 28 of the deflection and high voltage circuits 27, and adjusted to provide a positive gate pulse 83 to the cathode 77 during each horizontal retrace period which includes the duration interval of the color synchronizing bursts. Because of the action of the positive gate pulse 83 in raising the potential of cathode 77 above that of the anode 75 of diode 73, the diode 73 is caused to be non-conducting at least during the duration interval of the color synchronizing bursts. During the positive gate pulse 83, the anode 67 of the diode 63 is caused to be raised higher in potential than the potential applied to the cathode 65 of this diode thereby causing the diode 63 to conduct and, essentially speaking, couple terminal 69 to the resonant circuit 59 of the oscillator 39. The color synchronizing bursts are passed through the resonant circuit 59 and the piezo-electric crystal 55 in a manner whereby injection locking of the phase of the oscillations developed by the oscillator 39 is achieved and the oscillations produced in the resonant circuit 59 has a phase prescribed by the color synchronizing bursts.

When the gate pulse 83 causes the diode 63 to conduct, both the color synchronizing bursts appearing at the terminal 69 at that time and the oscillations produced in the resonator 59 will appear across the resonator 85 which is tuned to the frequency of the color synchronizing bursts. The circuit, made up of the diode 89 in series with the decay circuit 97, is coupled to the resonator 85 in a manner whereby it detects the signals which are produced across the resonant circuit 85 due to both the color synchronizing bursts and the oscillations developed by the oscillator 39. In addition, an AGC voltage supplied by the AGC circuit 25, is applied to the terminal 95 which represents the high potential terminal of the decay circuit 97. This AGC voltage is caused to be bled through the resistance 96 and added to the D.C. voltage produced in the decay circuit 97 resulting from the detection of the oscillations produced in the resonant circuit 85. The net voltage at the output terminal 95 is thus representative of the difference between the amplitude of the color synchronizing bursts and the amplitude of the horizontal synchronizing pulses which are included in the color television signal and which are utilized to produce the AGC voltage. This net voltage, produced at the output terminal 95, is then applied to the chroma filter and amplifier 35 in a manner whereby not only is automatic-chroma control achieved, but also a constant ratio is maintained between the amplitude of the high frequency burst components in the color television signal and the low frequency horizontal deflection synchronizing components in the color television signal.

An additional feature of the circuit is the fact that the net voltage at the output terminal 95 is also a function of the strength of the oscillations developed by the oscillator 39. Should this oscillation strength vary, the automatic-chroma control voltage will vary accordingly thereby producing a corresponding change in the level of the chroma signal being fed to the demodulators and matrix 37; by proper adjustment of the circuits involved, the net product of the separated color burst component and the amplitude of the oscillations developed by the oscillator 39 will be maintained substantially constant thereby rendering the demodulated color difference signals substantially free of unwanted variations due to changes in the characteristics of the radio transmission path between the transmitter and receiver as well as changes in the amplitude of the color oscillator in the receiver.

Having thus described the invention, what is claimed is:

1. In combination, in a color television signal receiver for receiving a color television signal having both high frequency components and low frequency components, an amplifier circuit means for amplifying a selected frequency region of said high frequency components and including a gain control means, an oscillator circuit means providing an output signal, phase synchronizing means for phase synchronizing said oscillator output signal by a selected signal in said high frequency component region of said color television signal, a detector circuit means coupled to said oscillator circuit means and also responsive to said selected signal for producing a reference signal which is indicative of not only the amplitude level of said selected signal but also of the amplitude level of the output signal of said oscillator circuit means, and means for applying said reference signal to said gain control means of said amplifier circuit means to control the gain of said amplifier circuit means.

2. In a color television receiver adapted to receive a color television signal including a color synchronizing burst having a prescribed frequency and phase, a chrominance signal, and deflection synchronizing signals, the combination of, a burst separator circuit means to separate said color synchronizing bursts from said color television signal, an oscillator circuit means including at least a resonant circuit which exhibits resonance at substantially the frequency of said color synchronizing burst and coupled to said burst separation circuit means to inject said color synchronizing bursts into said resonant circuit to synchronize the oscillations produced by said oscillator circuit at the phase and frequency prescribed by said color synchronizing burst, a signal strength indicator circuit means responsive to said deflection synchronizing signals and including apparatus for providing a first reference signal which is indicative of the signal strength of said deflection synchronizing signals, a detector circuit means coupled to both said burst separator circuit means and said oscillator circuit means to produce a second reference signal which is indicative of both the amplitude level of said synchronizing burst and the amplitude level of the oscillations developed by said oscillator means, means coupled to said signal strength indicator circuit means and said detector circuit means to combine said first reference signal and said second reference signal to yield a composite reference signal, a chrominance amplifier circuit means including apparatus for applying said chrominance signal and having a gain control means, and means for applying said composite reference signal to said gain control means to control the gain of said chrominance amplifier circuit.

3. In a color television receiver adapted to receive a color television signal having both high frequency and low frequency components and including a color synchronizing burst having a prescribed frequency and phase, the combination of a burst separator circuit means to separate said color synchronizing bursts from said color television signal, an oscillator circuit means including at least a resonant circuit which exhibits resonance at substantially the frequency of said color synchronizing burst, means coupled to said burst separation circuit means to synchronize the oscillations produced by said oscillator circuit means at the phase and frequency prescribed by said color synchronizing burst, a signal strength indicator circuit means responsive to selected low frequency components in said color television signal and including apparatus for providing a first reference signal which is indicative of the signal strength of said selected low frequency components, a detector circuit means coupled to both said burst separator circuit means and said oscilaltor circuit means to produce a second reference signal which is indicative of not only the amplitude level of said color synchronizing burst but also of the amplitude level of the oscillations developed by said oscillator, means for coupling said signal strength indicator circuit means to said detector circuit means to combine said first reference signal and said second reference signal to yield a composite reference signal, a signal amplifier circuit means including apparatus for amplifying selected high frequency components in said color television signal and having a gain control means, means for applying said composite reference signal to said gain control means to control the gain of said signal amplifier.

4. In a color television receiver adapted to receive a color television signal which includes color synchronizing bursts having a predetermined phase and frequency, a chrominance signal, a luminance signal and deflection synchronizing signals, an automatic chroma control circuit comprising in combination, a chrominance signal amplifier adapted to receive at least said chrominance signal and having a gain control means, an oscillator including at least an oscillatory circuit which has a resonant frequency substantially that of said color synchronizing burst, a first rectifier device, a second rectifier device, each of said first and second said rectifier devices having at least an anode and a cathode, a potential source and a resonant circuit, means for coupling said color television signal, said potential source, and said resonant circuit to the anodes of both said first and said second rectifier devices, means for coupling the cathode of said first rectifier circuit to said oscillator circuit, a keying signal generator including apparatus for producing pulses which have duration intervals corresponding to and coinciding with the duration interval of said color synchronizing burst and means for applying said pulses to the cathode of said second rectifier device whereby during the duration interval of said pulses said color synchronizing bursts are caused to pass through said first rectifier device into said oscillatory circuit to perform the function of phase control of the oscillations produced by said oscillator circuit and whereby said oscillations of said oscillator circuit and said color synchronizing bursts are caused to be both produced across said resonant circuit, a detector circuit means coupled to said resonant circuit and having an output circuit at which appears a first reference signal which is therefore indicative of not only the amplitude level of said color synchronizing bursts but also of the amplitude level of said oscillations produced by said oscillator circuit, a signal amplitude level indicator circuit means responsive to said color television signal and including apparatus for producing a second reference signal which is indicative of the signal strength of said deflection synchronizing signals, means for applying said second reference signal to the output circuit of said detector circuit means whereby a composite reference signal made up of prescribed magnitudes and polarities of said first reference signal and said second reference signal is produced, and means for applying said composite reference signal to said gain control means whereby the gain of said chrominance amplifier varies with a predetermined relationship with respect to the amplitude of said composite reference signal.

5. In a color television receiver adapted to receive a color television signal which includes color synchronizing bursts having a predetermined phase and frequency, a chrominance signal, a luminance signal, and deflection synchronizing signals, an automatic chroma control circuit comprising in combination, a chrominance signal amplifier adapted to be supplied with at least said chrominance signal and having a gain control means, an oscillator circuit means including at least a piezo-electric crystal oscillatory circuit which has a resonant frequency substantially that of said color synchronizing burst, a first rectifier device, a second rectifier device, each of said first and second said rectifier devices having at least an anode and a cathode, a potential source and a resonant circuit, means for coupling said color television signal, said potential source and said resonant circuit to the anodes of both said first and said second rectifier devices, means for coupling the cathode of said first rectifier circuit to said oscillator circuit means, a keying signal generator including apparatus for producing pulses which have duration intervals corresponding to and coinciding with the duration interval of said color synchronizing burst and means for applying said pulses to the cathode of said second rectifier device whereby during the duration interval of said pulses said color synchronizing bursts are caused to pass through said first rectifier device and through said piezo-electric crystal oscillatory circuit means to perform the function of phase control of the oscillations produced by said oscillator circuit means and whereby said oscillations of said oscillator circuit means and also said color synchronizing bursts are caused to be both produced across said resonant circuit, a detector circuit means coupled to said resonant circuit and having an output circuit at which appears a first reference signal which is therefore indicative of not only the amplitude level of said color synchronizing burst but also of the amplitude level of said oscillations produced by said oscillator circuit means, an automatic gain control circuit means responsive to said color television signal and including apparatus for producing a second reference signal which is indicative of the strength of said deflection synchronizing signals, means for applying said second reference signal to the output circuit of said detector circuit means whereby a composite reference signal made up of prescribed magnitudes and polarities of said first reference signal and said second reference signal is produced, and means for applying said composite reference signal to said gain control means whereby the gain of said chrominance amplifier varies with a predetermined relationship with respect to the amplitude of said composite reference signal.

6. In a color television receiver adapted to receive a color television signal having a prescribed bandwidth within which are included color synchronizing bursts having a predetermined phase and frequency, a chrominance signal and a luminance signal, an automatic chroma control circuit comprising in combination, a chrominance signal amplifier adapted to receive at least said chrominance signal and having a gain control means, an oscillator circuit means including at least an oscillatory circuit which has a resonant frequency substantially that of said color synchronizing burst, a first rectifier device, a second rectifier device, a potential source, and a resonant circuit means, means for coupling said color television signal, said potential source and said resonant circuit means to both said first and said second rectifier devices and means for coupling said first rectifier device between said resonant circuit means and said oscillatory circuit of said oscillator circuit means, a keying signal generator including apparatus for producing pulses which have duration intervals corresponding to the duration interval of said color synchronizing bursts, means for applying said pulses to said second rectifier device whereby during the duration interval of said pulses said color synchronizing bursts are caused to pass through said first rectifier device into said oscillatory circuit to perform the function of phase control of the oscillations produced by said oscillator means and whereby said oscillations of said oscillator circuit means and said color synchronizing bursts are caused to be both produced across said resonant circuit means, a detector circuit means coupled to said resonant circuit means and having an output circuit at which appears a first reference signal which is therefore indicative of not only the amplitude level of said color synchronizing burst but also of the amplitude level of said oscillations produced by said oscillator circuit means, a signal amplitude level indicator circuit means responsive to said color television signal and including apparatus for producing a second reference signal which is indicative of the signal strength of predetermined low frequency signals in said color television signal, means for applying said second reference signal to the output circuit of said detector circuit means whereby a composite reference signal made up of prescribed magnitudes and polarities of said first reference signal and said second reference signal is produced, and means for applying said composite reference signal to said gain control means whereby the gain of said chrominance amplifier varies with a predetermined relationship with respect to the amplitude of said composite reference signal.

7. In a color television receiver, the combination of: means for receiving radio broadcast composite color television signals having a chrominance component covering a first frequency band, a luminance component covering a second frequency band, a burst synchronizing component falling in said first frequency band and a line deflection synchronizing component falling in said second frequency band, said chrominance component being represented by phase and amplitude modulation of a color subcarrier bearing a synchronized time relationship to said line deflection synchronizing component, said received radio signals being subject to selective frequency disturbance resulting in undesired variations in the relative broadcast amplitudes of signals falling in said first and second frequency bands; signal processing means coupled with said receiving means for processing said received television signals into a visible color television image the color aspects of which are a function of the relative amplitudes of said received chrominance and luminance components; means coupled with said signal processing means and responsive to a control signal for controlling, on a frequency selective basis, the relative electrical response of said signal processing means to frequencies falling in said first and second bands; means included in said signal processing means for synchronously demodulating said chrominance component to provide color information signals, said synchronous demodulating means being characterized by the inclusion therein of a reference oscillator producing a reference signal, the frequency of said oscillator and reference signal being controlled by said burst component, said reference signal being subject to undesired variations in amplitude which in turn also produce undesired variations in the color aspects of said color television image; means responsive to the amplitude of said reference signal to develop an indicating signal indicating the amplitude of said reference signal; and means coupled with said indicating signal developing means and said electrical response controlling means for controlling the electrical response of said signal processing means in an electrical sense complementary to undesired variations in the amplitude of said reference signal.

8. In a color television receiver, the combination of: means for receiving radio broadcast composite color television signals having a chrominance component covering a first frequency band, a luminance component covering a second frequency band, a burst synchronizing component falling in said first frequency band and a line deflection synchronizing component falling in said second frequency band, said chrominance component being represented by phase and amplitude modulation of a color subcarrier bearing a synchronized time relationship to said line deflection synchronizing component, said received radio signals being subject to selective frequency disturbance resulting in undesired variations in the relative broadcast amplitudes of signals falling in said first and second frequency bands; a signal processing channel coupled with said receiving means for processing said received television signals; means coupled with said channel and responsive to a control signal for controlling, on a frequency selective basis, the relative electrical response of said channel to frequencies falling in said first and second bands; oscillator means included in said channel for providing a reference signal subject to variations in amplitude; means coupled with said channel and said oscillator means responsive to the amplitude of said received burst synchronizing components and reference signal to produce a composite control signal whose amplitude is substantially a continuous function of changes in the amplitude of a received burst synchronizing component and reference signal; and means applying said composite control signal to said response controlling means for controlling the relative response of said channel to frequencies falling in said first and second bands in a manner complementary to undesired variations in both the amplitude of said reference signal and said received burst synchronizing component.

References Cited in the file of this patent

UNITED STATES PATENTS 2,798,900 Bradley ---------------- July 9, 1957